DATA TRACKING SYSTEM

Filed June 13, 1961

2 Sheets-Sheet 1

INVENTOR
RAYMOND P. AUYANG

BY Robert W. Berray
ATTORNEY

March 23, 1965 R. P. AUYANG 3,175,205

DATA TRACKING SYSTEM

Filed June 13, 1961 2 Sheets-Sheet 2

United States Patent Office 3,175,205

Patented Mar. 23, 1965

3,175,205
DATA TRACKING SYSTEM

Raymond P. Auyang, Poughkeepsie, N.Y., assignor to International Business Machines Corporation, New York, N.Y., a corporation of New York Filed June 13, 1961, Ser. No. 109,563
8 Claims. (Cl. 340—174.1)

This invention relates to information recording and reproducing systems, and more particularly, to random access memory systems which utilize rotating discs as a storage medium.

In data processing and computing systems, information is frequently stored by recording the information and selectively reproducing the information when it is to be used. In one type of memory system for the storage of information, discrete areas of a recording medium are magnetized in accordance with electrical signals. In one such memory system, a rotating disc having a magnetizable surface is employed to store a relatively large amount of information in a relatively small space.

In such disc memory systems, the discrete areas of information are recorded in very closely spaced concentric tracks. Assuming that a transducer may be positioned over a desired track on the disc, means must be provided for insuring that the transducer maintains a position directly over the track center. Several systems have been devised for positioning a transducer relatively close to a data track center, but additional means must be provided for accurately controlling the transducer positioning means to find the data track center. These fine positioning systems must be capable of correcting for any mechanical discrepancies which may have resulted in a recording operation which may have caused the track to vary from its desired concentric position. The fine positioning control must also be able to correct for mistracking conditions caused by mechanical vibrations of the rapidly rotating storage disc or discrepancies between machines using the same disc.

One means for controlling the position of a transducer relative to the center of a data track has been to provide an accurately recorded pattern of servo control information. The servo control pattern is arranged on the disc to accurately define a concentric track which is a fixed predetermined distance from a desired data track. A servo transducer is mounted on the same positioning means with a data transducer. The two transducers are fixed at a distance apart equal to the predetermined distance between a servo track and a corresponding data track. Circuit means must be provided for reading a signal induced in the servo transducer for indicating that the servo transducer and thus the data transducer is not tracking along the desired track center.

One fine positioning control utilizes a servo pattern and transducer which produces a series of pulses which must be analyzed in accordance with amplitude and phase to determine any error correction needed. This system utilizes a transducer which is required to accurately balance out any generation of pulses when it is tracking in the desired relationship with the servo track. A well-balanced transducer and circuit are required to insure that when the transducer is accurately tracking, it reads servo information of two opposite magnetic polarities thus cancelling any effect on the transducer.

An object of this invention is to provide a fine positioning control system for use with a magnetic disc storage system.

Another object of this invention is to provide a fine positioning servo control pattern which operates on a principle of pulse width modulation.

An additional object to this invention is to provide circuitry for converting a pulse width modulated cyclic signal at a first frequency to a pulse width modulated cyclic signal at a lower frequency.

These and other objects are achieved in accordance with this invention by providing an array of frequency significant pairs of converging edge formations on a magnetic storage member. The array of edge formations describes a reference line situated in parallel with and at a predetermined distance from a storage path for data. A servo control positioning means is provided for mounting a servo transducer cooperating with the edge formations and a data transducer for cooperating with a data track. The servo transducer and data transducer are mounted on the positioning means at said predetermined distance apart. Means are provided for imparting relative movement betwen the magnetic storage member and the positioning means so that frequency significant signal pulses are created in the servo transducer. The time duration between adjacent signal pulses is used in circuit means for actuating the servo positioning means to cause the servo transducer to be moved to a position directly over the reference track center. When the servo transducer is tracking over the reference track center, the time duration betwen adjacent pulses in the transducer will be equal.

Another feature of this invention is the provision of circuit means for converting the frequency at which signal pulses are generated in the servo transducer to a lower frequency signal retaining the same time duration characteristics between adjacent pulses.

The foregoing and other objects, features and advantages of the invention will be apparent from the following more particular description of a preferred embodiment of the invention, as illustrated in the accompanying drawings.

Figures 1, 1A:
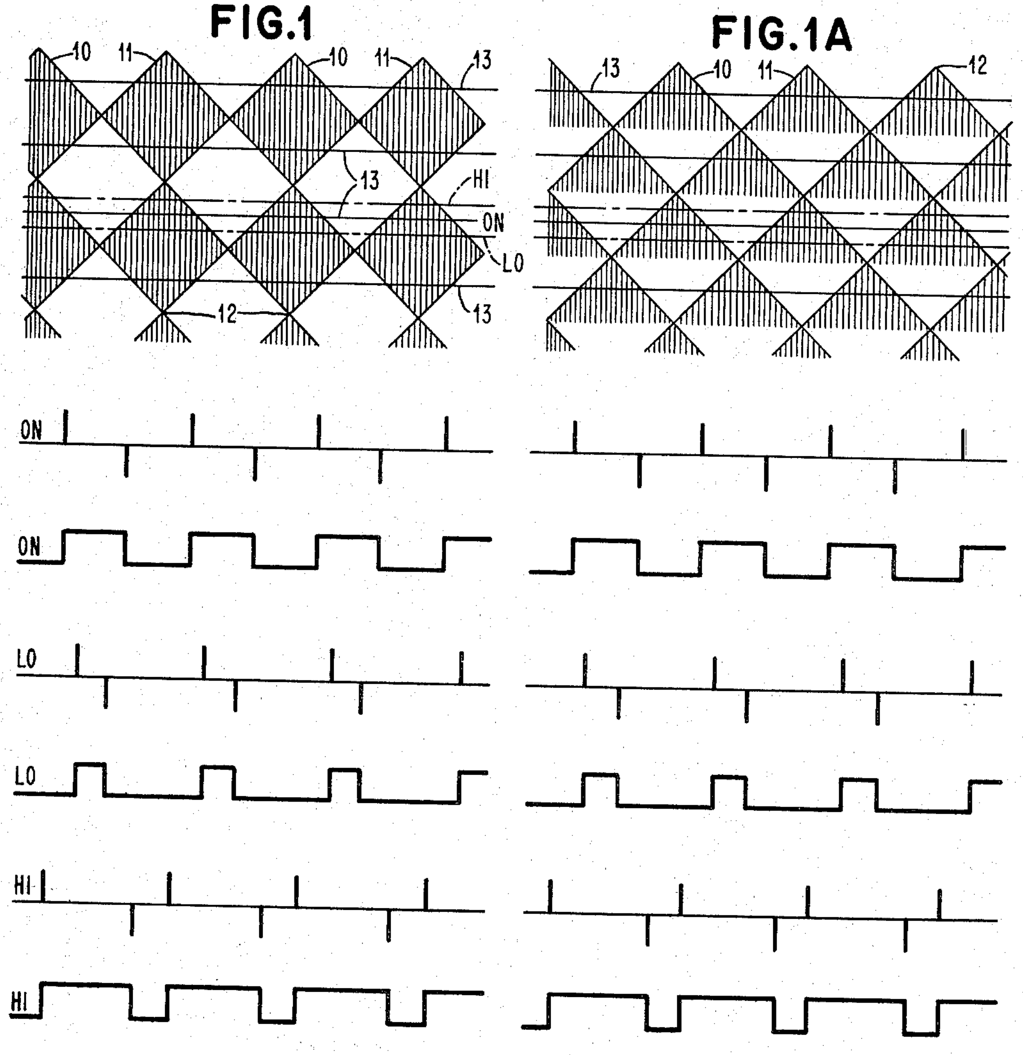
FIGURE 1 is a fragmentary view of the servo pattern on a magnetic recording disc and wave forms generated for certain tracking conditions.

FIGURE 1 shows one form of a permanently recorded servo pattern for practicing the present invention. This pattern consists of a first array of parallel edge formations 10 which converge at right angles with another array of parallel edge formations 11. The array of edge formations define the boundaries between areas of oppositely magnetized portions of the disc surface (shown as shaded and clear areas). The edge formations 10 and 11 converge at points 12 which are midway between equally spaced reference tracks 13. The reference tracks 13 have been shown in FIGURE 1 as straight lines, but it is to be understood that these reference tracks are equally spaced concentric circles spaced on a magnetic recording disc.

Certain tracking conditions of the servo transducer have been shown in FIGURE 1 and have been labeled from top to bottom as HI, ON and LO. The wave forms below the servo pattern shown in FIGURE 1 represent pulse pairs and bistable signals generated as a result of the tracking conditions previously described.

As the servo pattern passes in proximity to the servo transducer, a pulse will be generated in the transducer for each edge formation crossed. The pulse polarity will depend upon the polarity of the magnetization change. As shown on the wave forms of FIGURE 1, the pulse pairs consist of a positive polarity pulse followed by a negative polarity pulse. The time duration between pulse pairs is defined as the time between a negative pulse and the next following positive pulse. The time spacing between pulses of a pair and between pairs of pulses will be dependent upon the particular tracking condition of the servo transducer relative to the servo track center. The pulses generated are utilized in the circuitry of FIGURE 2 to be described later to generate a square wave signal which changes states upon the occurrence of each pulse.

As can be seen in FIGURE 1, if the transducer is tracking exactly on the servo track center, designated as ON, the duration between pulses of each pair and the duration between each pair of pulses is equal and will generate a square wave signal having equal positive and negative portions. If the servo transducer is tracking LO, the duration between the pulses of a pulse pair and the duration between pulse pairs will be such that for a complete cycle of the bistable signal there will be a greater negative portion than positive portion. In the HI tracking condition the time duration between pulses of each pair and the duration of between pulse pairs is such that the bistable signal resulting will have a larger positive portion than negative for each cycle.

The same concepts as described in relation to FIGURE 1 apply equally as well to the pattern shown in FIGURE 1–*a*. FIGURE 1–*a* shows a slight modification in the manner in which the servo pattern is recorded.

Figure 2:
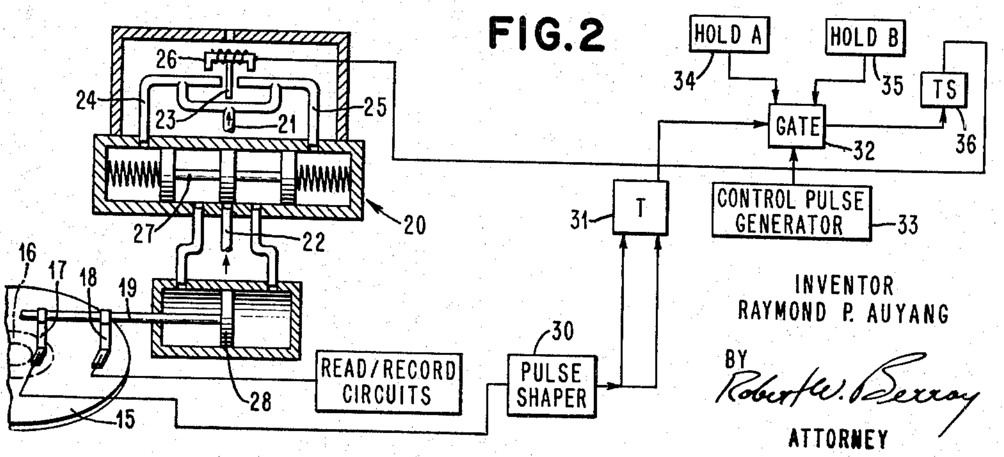
FIGURE 2 is a diagrammatic illustration of a positioning system and the circuit means for actuating the positioning system in response to servo information.

FIGURE 2 is a schematic representation of the entire system of the present invention. A fragmentary portion of a magnetic recording disc 15 is shown having a servo control pattern 16 recorded thereon. Cooperating with the magnetic disc 15 as it rotates is a servo transducer 17 and a data transducer 18 mounted a predetermined distance apart on a mounting means 19. Movements of the arm 19 are controlled directly by a fluid valve noted generally by the numeral 20. This device which makes up positioning means is a Moog Flow Control Servo Valve, Series 22, manufactured by the Moog Valve Company, Inc., East Aurora, New York.

The operation of the positioning means 20 will now be briefly described. Fluid pressure is entered into the positioning system by way of ports 21 and 22. An armature 23 is operative to alternately open and close two ports 24 and 25 in response to the polarity of electrical excitation to an electromagnet 26. Excitation of one polarity to the electromagnet 26 will be effective to close port 25, and excitation of the opposite polarity will be effective to close port 24. Dependent upon the port, 24 or 25, which is closed by armature 23, fluid pressure entered at 21 will be effective to move a valve 27 either right or left. The port, 24 or 25, which is open allows the fluid pressure from 21 to leak out of the particular port which is open. Depending upon the direction that valve 27 is moved, fluid pressure entered at 22 will be effective to move the piston 28 either right or left.

If a bistable signal such as shown in FIGURE 1 were applied to the electromagnet 26, the piston 28 would oscillate back and forth in accordance with the polarity of a bistable signal applied. If a signal such as the ON bistable signal shown in FIGURE 1 were applied to the electromagnet 26, it can be seen that piston 28 would oscillate back and forth about a fixed point. If several cycles of the LO or HI bistable signal were applied to the electromagnet 26, the piston 28 would oscillate back and forth but would have resultant movement in one of the two opposite directions as a result of the fact that greater or lesser durations of the two states of the signal will be applied to the electromagnet 26.

The remaining portions of FIGURE 2 show another important feature of this invention. The operation described in the previous paragraph would be sufficient to correct HI or LO mistracking condition of the servo transducer 17. It has been found, however, that the frequency at which the bistable signal operates as a result of the pulse pairs is too great to allow proper operation of the positioning means 20. A means was therefore devised for converting the frequency at which the bistable signal is generated as a result of the pulse pairs to a lower frequency bistable signal while retaining the same ratio of positive and negative portions of the signal in the lower frequency bistable signal. The original pulse pairs generated from the transducer 17 are applied through a pulse shaper 30 to a trigger 31 for generating the bistable signal shown in FIGURE 1. The bistable signal output of trigger 31 is applied to a gate arrangement 32. A frequency conversion control signal is applied to gate 32 by a control pulse generator 33. The control pulse generator 33 generates a symmetrical square wave gating signal at a frequency which is a sub-multiple of the frequency of the signal generated by trigger 31. The control signal may be generated by independent means or it could be generated by a separate timing track and transducer fixed to and related to a specific number of edge formations on the servo pattern.

First and second analog signal developing means 34 and 35 are effective under control of the polarity of the control signal for developing an analog voltage having a value proportional to the sum of the durations of a group of the positive stable states of the trigger 31 output. During one-half of the control signal cycle analog means 34 will develop the analog voltage signal. During the second half of the control signal cycle analog circuit 35 will develop an analog voltage signal. During the second half of the control signal cycle the voltage of circuit 34 will be applied through gate 32 to a Schmidt trigger 36. The Schmidt trigger 36 will change its stable state upon application of the analog voltage signal and will maintain that stable state for a period equal to the time required for the analog voltage signal from circuit 34 to discharge to a predetermined level. Again during the first half cycle of the control signal, analog circuit 34 will develop an analog voltage signal while circuit 35 is controlling the stable state of the Schmidt trigger 36.

It is the output of the Schmidt trigger 36 which controls the energization of the electromagnet 26. Since the analog voltage developed in circuits 34 and 35 is directly proportional to the ratio of stable states from trigger 31, the duration of the stable states of Schmidt trigger 36 will be in the same direct proportion but at a frequency determined by the control signal generator 33.

Figure 3:
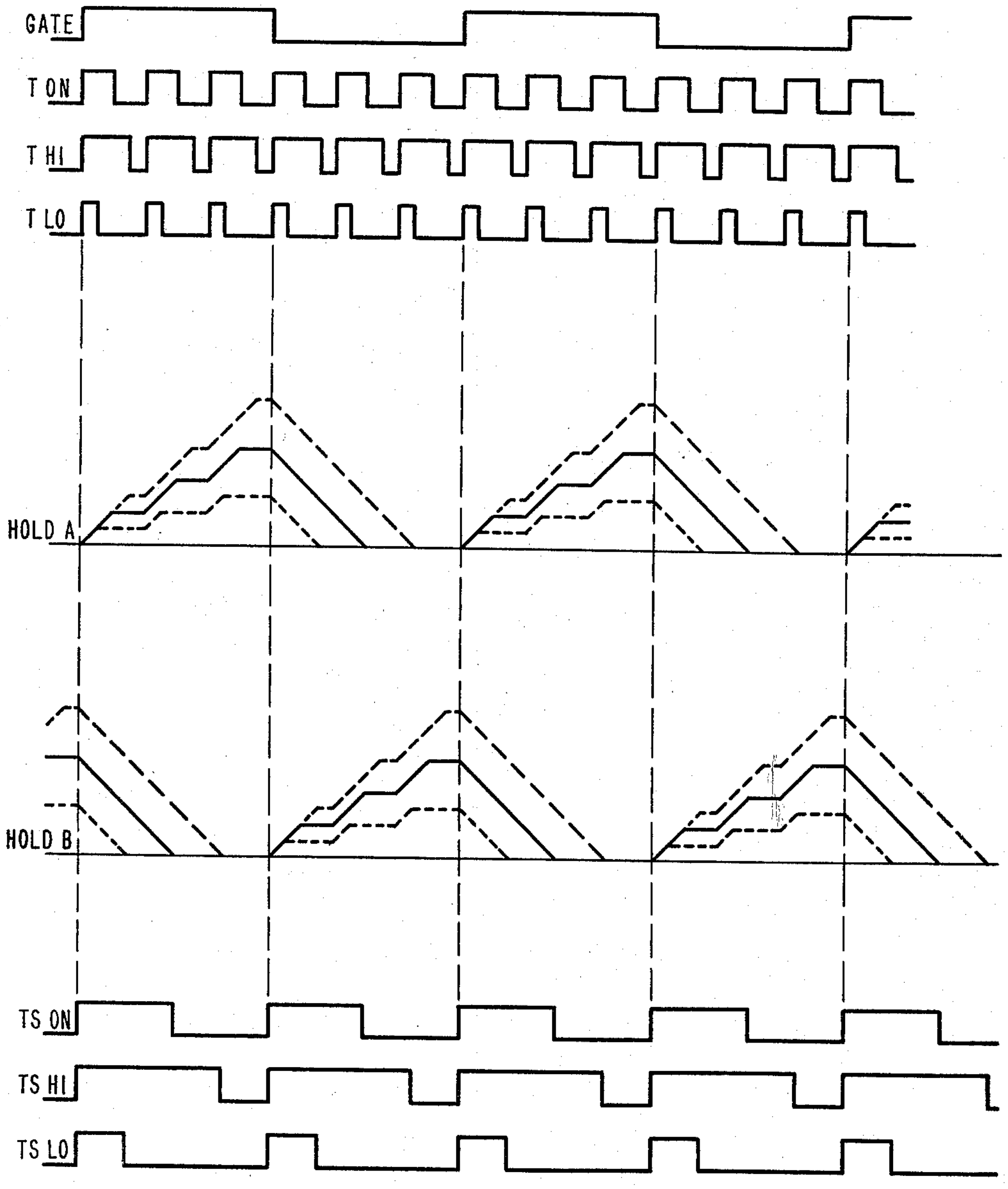
FIGURE 3 is a set of graphical illustrations showing the relative times of occurrence of signals within the circuitry of FIGURE 2 for certain tracking conditions.

FIGURE 3 shows various wave forms for making a frequency conversion of three-to-one for the various tracking conditions shown in FIGURE 1. The top wave form shows the bistable control signal applied to gate 32. The next three wave forms show the bistable signal generated by trigger 31 for a specified tracking condition. The next two wave forms show the operation of the analog circuits 34 and 35 in response to the control signal and the bistable signal from trigger 31.

During the first half cycle of the control signal analog circuit 34 charges a capacitor for a period equal to the positive stable state of the bistable signal from trigger 31. The control signal frequency is such that three complete cycles from trigger 31 are used to develop an analog voltage having a value proportional to the duration of the positive stable condition from trigger 31. At the commencement of the second half cycle of the control signal, analog circuit 35 starts developing an analog voltage signal. During this second half cycle the analog voltage signal developed by circuit 34 is applied to the Schmidt trigger 36 and commences to discharge its capacitor. At the commencement of the discharge, Schmidt trigger 36 is caused to switch to a first stable state. The duration of this stable state is a function of the time constant of the analog circuit 34, and will, therefore, vary depending upon the value of the analog voltage developed. When the analog voltage has discharged to a predetermined level, the Schmidt trigger 36 will switch to its second stable state.

Under control of the bistable signal from the generator 33 Schmidt trigger 36 will produce a bistable signal having positive and negative portions in a ratio directly related to the ratio of positive and negative portions of the bistable signal developed from trigger 31. As mentioned previously, it is this analog voltage responsive bistable signal which is applied to the electromagnet 26 in the positioning means 20 for causing a resultant movement of the servo and data transducers to correct a mistracking condition.

There has thus been described a servo control system utilizing a pattern arrangement which does not require delicate balance between circuit components but utilizes a more easily controlled frequency or pulse width modulation. There has also been shown circuit means utilized as part of the present invention for effecting a frequency conversion while maintaining a pulse width modulation proportional to that of a signal at a higher frequency.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A transducer positioning system comprising:
a magnetic storage member having a data storage path;
servo controlled positioning means;
a servo transducer and a read-write transducer mounted a predetermined distance apart on said positioning means for synchronous movement adjacent the surface of said storage member;
an array of frequency significant pairs of converging edge formations on said storage member and associated with said servo transducer, said formations being positioned along and extending on either side of a reference line situated in parallel with and at a distance from said storage path which corresponds to said predetermined distance;
means for imparting relative movement between said storage member and said positioning means so that standard frequency signal pairs are created in said servo transducer by passage of said pairs of edge formations when said transducer is tracking along said reference line, and so that non-standard frequency signal pairs are created in said servo transducer by passage of said pairs of edge formations when said transducer is tracking on either side of said reference line;
and circuit means responsive to said non-standard signal pairs for actuating said positioning means so that said transducers are moved in an appropriate direction for re-establishing said standard frequency, whereby said read-write transducer is maintained in accurate tracking relation with respect to said data storage path.

2. A transducer positioning system comprising:
a magnetic storage member having a data storage path;
servo controlled positioning means;
a servo transducer and a read-write transducer mounted a predetermined distance apart on said positioning means for synchronous movement adjacent the surface of said storage member;
an array of frequency significant pairs of converging edge formations on said storage member and associated with said servo transducer, said formations being positioned along and extending on either side of a reference line situated in parallel with and at a distance from said storage path which corresponds to said predetermined distance;
means for imparting relative movement between said storage and said positioning means so that pairs of signal pulses are created in said servo transducer by passage of said pairs of edge formations;
and circuit means responsive to the time displacement between pulses of each of said pairs of pulses and the time displacement between adjacent pairs of said pulses for actuating said positioning means so that said transducers are moved in an appropriate direction for creating an equal time displacement between pulses of each of said pairs and adjacent pairs of said pulses, whereby said read-write transducer is maintained in accurate tracking relation with respect to said data storage path.

3. A transducer positioning system comprising:
a magnetic storage member having a plurality of data storage paths;
servo controlled positioning means;
a servo transducer and at least one read-write transducer mounted a predetermined distance apart on said positioning means for synchronous movement adjacent the surface of said storage member;
an array of frequency significant pairs of converging edge formations on said storage member and associated with said servo transducer, said formations being positioned along and extending on either side of a plurality of reference lines situated in parallel with and at said predetermined distance from a corresponding one of said storage paths;
means for imparting relative movement between said storage member and said positioning means so that standard frequency signal pairs are created in said servo transducer by passage of said pairs of edge formations when said transducer in tracking along a desired one of said reference lines, and so that non-standard frequency signal pairs are created in said servo transducer by passage of said pairs of edge formations when said transducer is tracking on either side of said desired reference line;
and circuit means responsive to said non-standard signal pairs for actuating said positioning means so that said transducers are moved in an appropriate direction for re-establishing said standard frequency, whereby said read-write transducer is maintained in accurate tracking relation with respect to the correspondingly desired one of said data storage paths.

4. A transducer positioning system comprising:
a magnetic storage member having a data storage path;
servo controlled positioning means;
a servo transducer and a read-write transducer mounted a predetermined distance apart on said positioning means for synchronous movement adjacent the surface of said storage member;
an array of parallel edge formations which converge at right angles with another array of parallel edge formations on said storage member and associated with said servo transducer to form intersections on either side of and equidistant from a reference line situated in parallel with and at said predetermined distance from said storage path;
means for imparting relative movement between said storage member and said positioning means so that standard frequency signal pairs are created in said servo transducer by passage of said edge formations when said transducer is tracking along said reference line, and so that non-standard frequency signal pairs are created in said servo transducer by passage of said edge formations when said transducer is tracking on either side of said reference line;
and circuit means responsive to said non-standard signal pairs for actuating said positioning means so that said transducers are moved in an appropriate direction for re-establishing said standard frequency, whereby said read-write transducer is maintained in accurate tracking relation with respect to said data storage path.

5. A transducer positioning system comprising:

a magnetic storage member having a data storage path;

servo controlled positioning means;

a servo transducer and a read-write transducer mounted a predetermined distance apart on said positioning means for synchronous movement adjacent the surface of said storage member;

an array of parallel edge formations which converge at right angles with another array of parallel edge formations on said storage member and associated with said servo transducer to form intersections on either side of and equidistant from a reference line situated in parallel with and at said predetermined distance from said storage path;

means for imparting relative movement between said storage member and said positioning means so that signal pulses having equal time displacement between adjacent pulses are created in said servo transducer by passage of said edge formations when said transducer is tracking along said reference line, and so that signal pulses having unequal time displacement between adjacent pulses are created in said servo transducer by passage of said edge formations when said transducer is tracking on either side of said reference line;

and circuit means responsive to said signal pulses having unequal displacement for actuating said positioning means so that said transducers are moved in an appropriate direction for re-establishing said equal time displacement whereby said read-write transducer is maintained in accurate tracking relation with respect to said data storage path.

6. A transducer positioning system in accordance with claim 5 wherein said circuit means includes:

a bistable device responsive to each of said signal pulses for switching from one stable state to the opposite stable state;

and control means responsive to the unequal duration of said two opposite stable states for actuating said positioning means so that said transducers are moved in an appropriate direction for establishing equal durations of said two stable states.

7. A transducer positioning system in accordance with claim 6 wherein said control means includes:

fluid valve means for actuating said positioning means, responsive to said one stable state for causing movement of said transducers in a first direction and responsive to said opposite stable state for causing movement of said transducers in an opposite direction.

8. A transducer positioning system in accordance with claim 6 wherein said control means includes:

a control pulse generator for generating a bistable signal having first and second stable states of equal duration and a cycle of operation a predetermined submultiple frequency of a cycle of operation of said bistable device;

first and second conversion means responsive to the first and second stable states respectively of said control pulse generator and further responsive to one stable state of said bistable device for developing an analog signal having a value proportional to the duration of a predetermined number of said one stable states of said bistable device;

analog signal responsive means selectively connectable to said first and second conversion means in response to the second and first stable states respectively of said control pulse generator for developing another bistable signal having one stable state proportional to the value of said analog signal, whereby said positioning means is actuated by said analog signal responsive means bistable signal at said predetermined sub-multiple frequency.

References Cited by the Examiner

UNITED STATES PATENTS

| | | | |
|---|---|---|---|
| 2,820,942 | 1/58 | Depenbrock | 321—68 |
| 2,968,758 | 1/61 | Ludbrook | 321—68 |
| 3,007,144 | 10/61 | Hagopian | 340—174.1 |
| 3,023,404 | 2/62 | Dickerson | 340—174.1 |

IRVING L. SRAGOW, *Primary Examiner.*